United States Patent Office 3,255,026
Patented June 7, 1966

3,255,026
PHOTOTROPIC GLASS COMPOSITION
Jackson S. Stroud, Corning, N.Y., assignor to Corning Glass Works, Corning, N.Y., a corporation of New York
No Drawing. Filed Oct. 22, 1962, Ser. No. 232,302
1 Claim. (Cl. 106—52)

This invention relates a glass compositions which are particularly suitable for use in applications where it is desirable to decrease the transmission of the glass to visible radiation as the incident radiation thereon increases.

The principal object of this invention is to provide glass compositions which are phototropic, that is, that possess the characteristic that their transmission of visible radiation is dependent upon the amount of actinic radiation to which it is exposed. Glasses having such characteristic are valuable when used for windows in automobiles and buildings because such glasses become darker in color when exposed to intense sunlight and fade to a lighter color, with corresponding increase in transmission of visible light, when the ambient radiation is less intense, such as occurs on a cloudy day.

I have found that the principal object of this invention can be achieved in a reduced silicate glass containing 0.005–1.0% cerium oxide ($Ce_2O_3$) and 0.005–1.0% manganese oxide (MnO). While the reason that these oxides cause this desired effect is not known, it is believed that the cerous ion ($Ce^{3+}$) is readily activated by ultraviolet radiation having a wave length of 2700–3500 A. and that this activated cerous ion catalyses the activation of a manganous ion ($Mn^{2+}$) which in turn is readily capable of losing an electron to produce an manganic ($Mn^{3+}$) ion and a free electron. The reversibility of this darkening phenomenon, that is fading of the darkened glass, is due to the fact that the glass is free of polyvalent cations such as iron or titanium which act as electron traps. Therefore, the free electrons produced by the transformation of the excited manganous ions into the manganic ions are free to recombine with the manganic ions when the actinic radiation is removed from the surface of the glass.

Examples of glass compositions of this invention which exhibit the desired characteristic of reversible darkening upon exposure to actinic radiation are set forth in Table I. The compositions specified in Table I are set forth on a weight percent basis as analyzed, and while each composition does not total 100.0 exactly, the proportions are accurately specified on a percentage basis within the limitation of significant figures.

TABLE I

|  | 1 | 2 | 3 | 4 | 5 | 6 |
|---|---|---|---|---|---|---|
| $SiO_2$ | 75.0 | 74.9 | 74.9 | 74.9 | 74.3 | 74.2 |
| $Na_2O$ | 25.0 | 25.0 | 25.0 | 25.0 | 24.8 | 24.8 |
| MnO | .008 | .008 | .08 | .08 | .8 | .008 |
| $Ce_2O_3$ | .01 | .1 | .01 | .1 | .1 | 1.0 |

The glasses of this invention are produced in accordance with conventional glass making techniques by melting suitable batch ingredients in melting units such as crucibles, pots, or tanks at temperatures of 1300–1500° C. and the molten glass is formed by pressing, drawing, blowing, rolling, and similar forming methods to articles of the desired shape and cooled. As it is necessary that the glass compositions be in the reduced state, reducing agents must be included within the batch constituents to assure that essentially all of the cerium and manganese are present in the glass in the cerous and manganous state respectively. While the reducing agents and amounts thereof may vary greatly depending upon melting conditions, such as temperature and time of melting, and the particular type of melting unit utilized, suitable conditions can be readily determined by simple experimentation. However, the glass of Example 1 can be readily produced in a covered crucible by melting the following batch set forth in parts by weight, at a temperature of 1300° C. for four hours.

| | |
|---|---|
| Sand | 375 |
| $Na_2CO_3$ | 210 |
| $C_6H_{14}O_6$ | 5 |
| $MnO_2$ | 0.05 |
| $(NH_4)_2Ce(NO_3)_6$ | .17 |

The molten glass is then formed into slabs by pouring it into a metal form and then cooling it.

The glasses of this invention are transparent when formed and the color thereof varies from colorless to a straw-yellow. Upon exposure to ultraviolet light, the glasses darken and attain a purple color thereby decreasing the amount of visible light transmitted therethrough. When the ultraviolet radiation is removed from the surface of these glasses, the color fades and the glasses return to their original appearance in a very few minutes.

In view of the fact that the phototropic effect is apparently caused by interaction of ultraviolet radiation with the cerous ions in the glass, the glass should be free of other ultraviolet absorbing ions such as iron and titanium. Likewise, it should also be free of polyvalent metal cations which act as stable electron traps for the free electrons produced by the transformation of the manganous ion to the manganic ions, such as antimony, iron, and titanium. It is also apparent that because the glasses must be produced under reducing conditions, that oxides which are readily reduced to the metallic condition should be present in amounts insufficient to interfere with the transparency of the glass, and should, preferably, be totally absent from the glass. Therefore, the total amount of readily reducible metals such as lead, gold, silver, and copper should be less than 1% by weight of the glass composition.

What is claimed is.

A phototropic body comprising a reduced silicate glass consisting essentially on a weight percent basis as analyzed of 74–75% $SiO_2$, 24–25% $Na_2O$, 0.005–1.0% $Ce_2O_3$, and 0.005–1.0% MnO, said glass being free of ultra-violet radiation absorbing ions other than said cerium and manganese and polyvalent metal cations which act as electron traps and also containing less than 1% by weight of readily reducible metals.

References Cited by the Examiner

UNITED STATES PATENTS

| | | | |
|---|---|---|---|
| 2,440,048 | 4/1948 | Hood | 106—52 |
| 2,515,938 | 7/1950 | Stookey | 106—52 |
| 2,752,506 | 6/1956 | Fitzgerald et al. | 204—154 |
| 3,046,400 | 7/1962 | Paymal | 106—52 |
| 3,097,172 | 7/1963 | Ginther | 106—52 |

OTHER REFERENCES

Ginther et al., Trans. Nuclear Science, Dec. 1958, "Glass Scintillators" (pages 92–95).

TOBIAS E. LEVOW, Primary Examiner.

H. McCARTHY, Assistant Examiner.